(12) United States Patent
Voiles et al.

(10) Patent No.: US 11,467,617 B1
(45) Date of Patent: Oct. 11, 2022

(54) CABLE-LINKED BRAKE PEDAL ASSEMBLIES

(71) Applicants: Jeffrey T. Voiles, Niles, IL (US); Roy Romana, Chicago, IL (US); Steven E. Rickenbrode, Elmhurst, IL (US)

(72) Inventors: Jeffrey T. Voiles, Niles, IL (US); Roy Romana, Chicago, IL (US); Steven E. Rickenbrode, Elmhurst, IL (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/513,178

(22) Filed: Oct. 28, 2021

(51) Int. Cl.
| | |
|---|---|
| G05G 1/30 | (2008.04) |
| B60T 7/04 | (2006.01) |
| B64C 25/42 | (2006.01) |
| G05G 1/34 | (2008.04) |
| B64C 25/44 | (2006.01) |
| B60T 7/06 | (2006.01) |

(52) U.S. Cl.
CPC .................. *G05G 1/34* (2013.01); *B60T 7/06* (2013.01); *B64C 25/44* (2013.01)

(58) Field of Classification Search
CPC .... G05G 1/30; G05G 1/34; B60T 7/04; B60T 7/06; B64C 25/44
See application file for complete search history.

(56) References Cited

U.S. PATENT DOCUMENTS

| | | | |
|---|---|---|---|
| 4,192,476 A | 3/1980 | Byers | |
| 4,938,304 A * | 7/1990 | Yamaguchi | F02D 11/10 180/197 |
| 5,056,742 A | 10/1991 | Sakurai | |
| 5,725,184 A | 3/1998 | Kang et al. | |
| 5,797,564 A * | 8/1998 | Cartmell | G05D 1/0061 244/223 |
| 5,806,806 A * | 9/1998 | Boehringer | G05D 1/0077 244/196 |
| 5,878,981 A * | 3/1999 | Dewey | G09B 9/28 434/45 |

(Continued)

FOREIGN PATENT DOCUMENTS

| | | | |
|---|---|---|---|
| CN | 110654531 A | * | 1/2020 |
| DE | 819047 C | * | 10/1951 |

(Continued)

*Primary Examiner* — Adam D Rogers
(74) *Attorney, Agent, or Firm* — Reinhart Boerner Van Deuren P.C.

(57) ABSTRACT

A cable-linked brake pedal assembly for an airplane. The assembly includes a first cable assembly with a first end attached to a pilot-side brake pedal and a second end attached to a first bell crank assembly, and a second cable assembly with a first end attached to a copilot-side brake pedal and a second end attached to a second bell crank assembly. A first connecting rod with a first rod end is attached to the first bell crank assembly and a second rod end is attached to the second bell crank assembly. The connection between the first and second cable assemblies, first and second bell crank assemblies, and first connecting rod is configured such that depressing the pilot-side brake pedal moves the first cable assembly, first connecting rod, and second cable assembly in such a way as to cause a corresponding depression of the copilot-side brake pedal.

13 Claims, 5 Drawing Sheets

(56) References Cited

U.S. PATENT DOCUMENTS

| | | | | |
|---|---|---|---|---|
| 6,913,226 | B2 * | 7/2005 | Huynh | B64C 13/345 |
| | | | | 244/75.1 |
| 6,929,222 | B2 * | 8/2005 | Djuric | B64C 13/30 |
| | | | | 244/220 |
| 6,981,409 | B2 * | 1/2006 | Huynh | G01L 5/22 |
| | | | | 73/862.01 |
| 7,207,238 | B2 * | 4/2007 | Feng | G05G 1/34 |
| | | | | 74/562.5 |
| 10,377,468 | B2 | 8/2019 | Carner et al. | |
| 10,894,595 | B1 * | 1/2021 | Wright | B64C 13/044 |
| 2014/0131523 | A1 | 5/2014 | Carner et al. | |
| 2021/0129975 | A1 | 5/2021 | Voiles et al. | |

FOREIGN PATENT DOCUMENTS

| | | | |
|---|---|---|---|
| DE | 4116924 A1 * | 11/1992 | |
| KR | 100369119 B1 | 1/2003 | |

\* cited by examiner

CABLE-LINKED BRAKE PEDAL ASSEMBLIES

FIELD OF THE INVENTION

This invention generally relates to a cable-linked brake pedal assembly for control of an airplane.

BACKGROUND OF THE INVENTION

Typically, piloted airplanes have certain control surfaces including horizontal stabilizers or ailerons, and vertical stabilizers or rudders to control movement of the airplane during flight. These control surfaces are also used to trim, or stabilize, the airplane during flight. Also, like automobiles, airplanes also include braking systems to control movement of the plane while on the ground. Generally, these conventional braking and control surfaces, including the rudder, are operated by various mechanical links and connecting rods or hydraulic or electromechanical actuators, which are operated by the pilot and allow the pilot to control the airplane's flight path. For various reasons, it is often desirable to link the rudder and braking controls of the pilot and co-pilot. The aforementioned conventional rudder and braking system are typically operated by pedals located under the cockpit instrument panel. In conventional systems, these mechanical linkages typically contain bell cranks and connecting rods, and extend under the floor of the flight deck.

Embodiments of the invention detailed below represent an improvement to the state of the art with respect to airplane control systems. These and other advantages of the invention, as well as additional inventive features, will be apparent from the description of the invention provided herein.

BRIEF SUMMARY OF THE INVENTION

In one aspect, embodiments of the invention provide a cable-linked brake pedal assembly for an airplane. The assembly includes a first cable assembly with a first end attached to a pilot-side brake pedal and a second end attached to a first bell crank assembly, and a second cable assembly with a first end attached to a copilot-side brake pedal and a second end attached to a second bell crank assembly. A first connecting rod with a first rod end is attached to the first bell crank assembly and a second rod end is attached to the second bell crank assembly. The connection between the first and second cable assemblies, first and second bell crank assemblies, and first connecting rod is configured such that depressing the pilot-side brake pedal moves the first cable assembly, first connecting rod, and second cable assembly in such a way as to cause a corresponding depression of the copilot-side brake pedal.

In a particular embodiment, the connection between the first and second cable assemblies, first and second bell crank assemblies, and first connecting rod is configured such that depressing the copilot-side brake pedal moves the second cable assembly, first connecting rod, and first cable assembly in such a way as to cause a corresponding depression of the pilot-side brake pedal.

In a further embodiment, the cable-linked brake pedal assembly also includes a third cable assembly with a first end attached to a second pilot-side brake pedal and a second end attached to a third bell crank assembly, a fourth cable assembly with a first end attached to a second copilot-side brake pedal and a second end attached to a fourth bell crank assembly, and a second connecting rod with a first rod end attached to the third bell crank assembly and a second rod end attached to the fourth bell crank assembly. The connection between the third and fourth cable assemblies, third and fourth bell crank assemblies, and second connecting rod being configured such that depressing the second pilot-side brake pedal moves the third cable assembly, second connecting rod, and fourth cable assembly in such a way as to cause a corresponding depression of the second copilot-side brake pedal.

In a particular embodiment, the connection between the third and fourth cable assemblies, third and fourth bell crank assemblies, and second connecting rod is configured such that depressing the second copilot-side brake pedal moves the fourth cable assembly, second connecting rod, and third cable assembly in such a way as to cause a corresponding depression of the second pilot-side brake pedal.

In certain embodiments, the first bell crank assembly includes an inner bell crank and an outer bell crank, each configured as a wheel member, the inner bell crank attached to an end of the first cable assembly. The outer bell crank may be attached to the first rod end of the first connecting rod. In a particular embodiment, the inner and outer bell cranks are coupled by a jam alleviation mechanism such that the inner and outer bell cranks move in unison. In particular embodiments, the jam alleviation mechanism comprises a spring-loaded detent mechanism configured to uncouple the inner and outer bell cranks so that the inner bell crank can move independently of the outer bell crank. In more particular embodiments, the spring-loaded detent mechanism is configured to displace a pin that couples the inner and outer bell cranks when a predetermined amount of torque is applied to the first bell crank assembly.

Embodiments of the first cable assembly include an inner core, which is drawn in tension when the pilot-side brake pedal is depressed. The first cable assembly may also include an outer conduit, which provides a flexible service loop. In some embodiments, the first cable assembly further includes an end fitting to facilitate attachment to the first bell crank assembly. Additionally, the first cable assembly may include an end ferrule configured for attachment to a bell crank of the first bell crank assembly.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
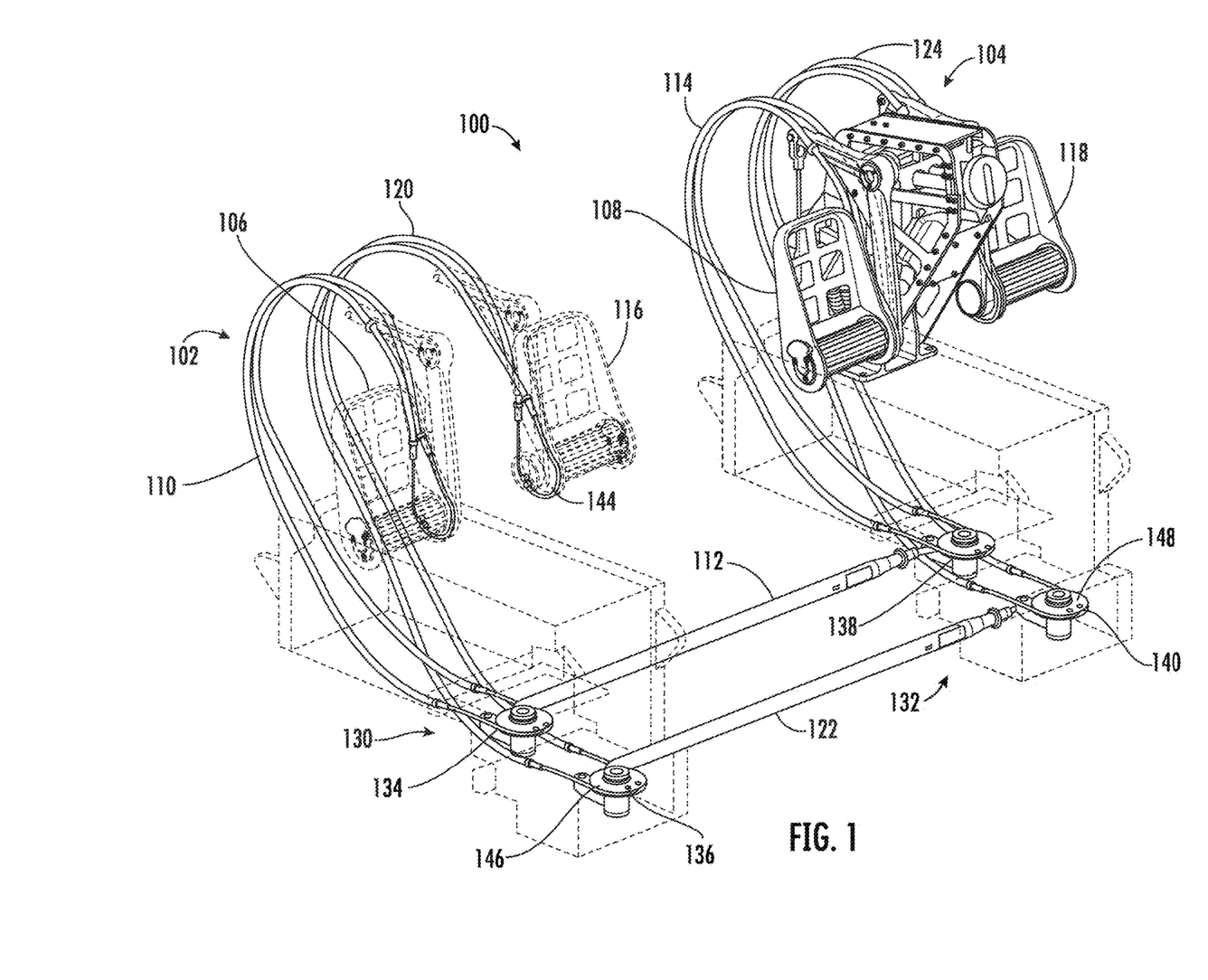
FIG. 1 is a perspective view of a cable linked brake pedal assembly for an airplane, constructed in accordance with an embodiment of the invention.

FIG. 1 is a perspective view of a cable linked brake pedal assembly 100 for an airplane, constructed in accordance with an embodiment of the invention. In the embodiment shown, a pilot-side brake pedal assembly 102 is connected to a co-pilot-side brake pedal assembly 104 via a cable system, which will be described in more detail below. As can be seen in FIG. 1, a first pilot-side pedal 106 is coupled to a first co-pilot-side pedal 108 via a first pilot-side cable pair 110, a first connecting rod 112, and a first co-pilot-side cable pair 114. Similarly, a second pilot-side pedal 116 is coupled to a second co-pilot-side pedal 118 via a second pilot-side cable pair 120, a second connecting rod 122, and a second co-pilot-side cable pair 124.

Figure 2:
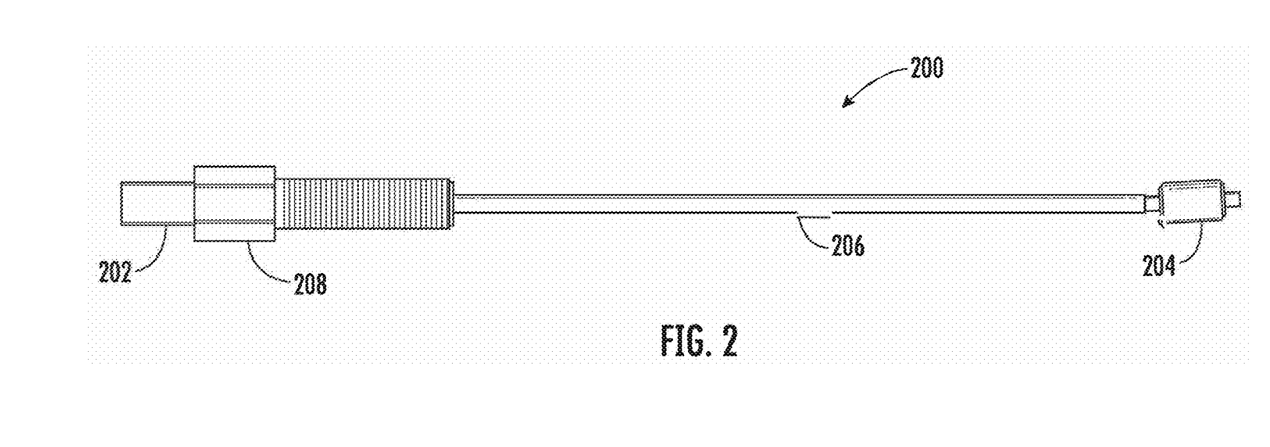
FIG. 2 is a plan view of the cable member in accordance with an embodiment of the invention.

FIG. 2 is a plan view of the cable member 200 in accordance with an embodiment of the invention. The cable member 200 includes an outer conduit 202 and an end fitting 208 for attachment and tensioning. The inner core 206 of the cable assembly is drawn in tension when the brake pedal 106, 108, 116, 118 is actuated and pulls on the cable end ferrule 204. The tension in the cable inner core 206 transfers motion to a bell crank assembly (shown 130, 132 in FIG. 1) through wheel members attached to the brake pedal 106, 108, 116, 118, similar to the wheel on a pulley system. The assembly 100 is designed such that the cable tension transmits an identical motion back to the opposite station pedal through the cable end ferrule 204 of the cable member 200 for the opposite station pedal.

Figure 3:
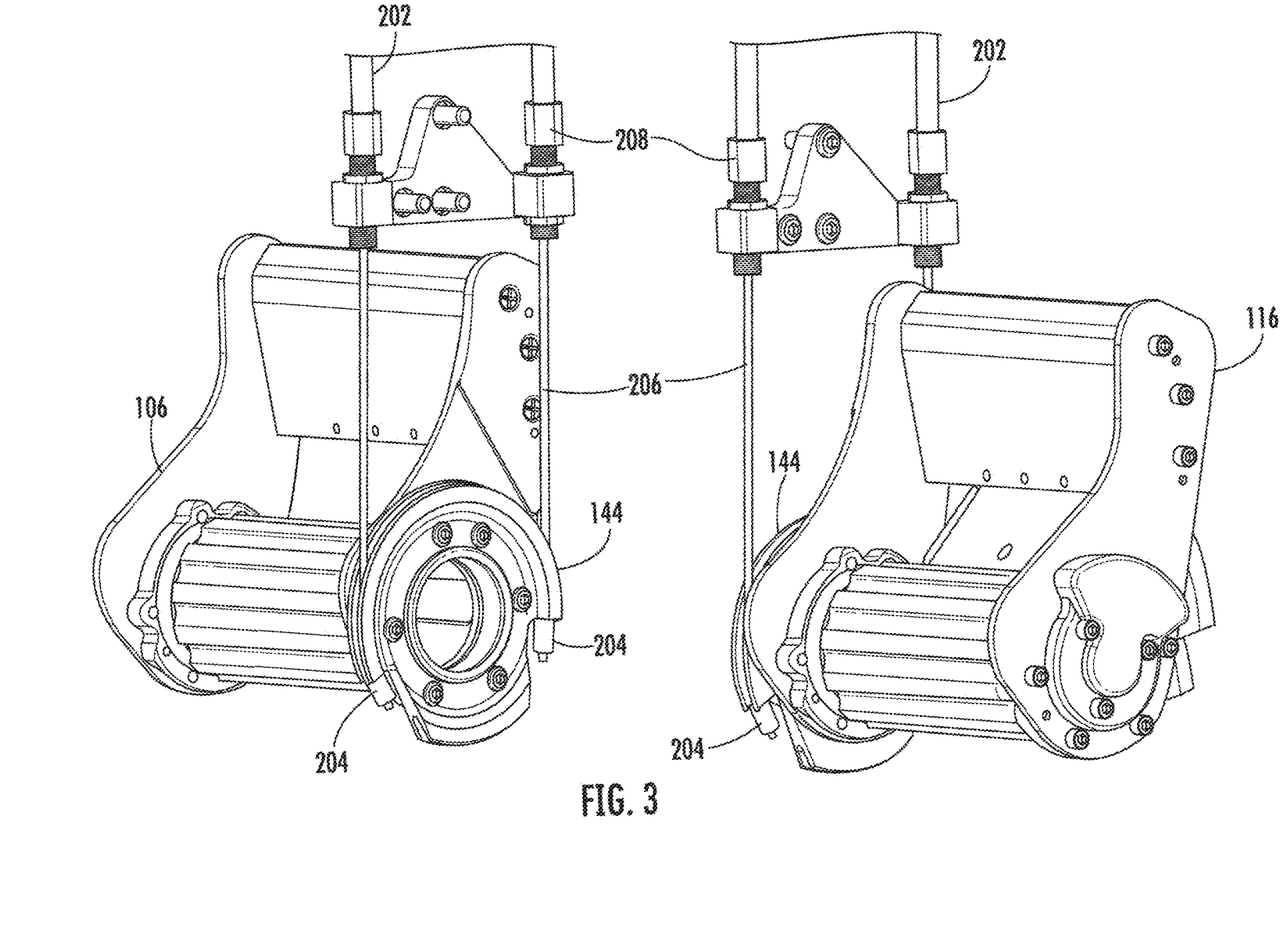
FIG. 3 is a perspective view showing a close up view of two of the pedals shown in FIG. 1.

Referring again to FIG. 1, the pilot-side bell crank assembly 130 includes a first pilot-side bell crank 134 and a second pilot-side bell crank 136. The co-pilot-side bell crank assembly 132 includes a first co-pilot-side bell crank 138 and a second co-pilot-side bell crank 140. FIG. 3 is a perspective view showing a close up view of two of the pedals 106, 116, shown in FIG. 1, as coupled to their respective cable members 200. Each pedal 106, 116 has an integral wheel member 144, similar to the wheel member for a pulley system. In a certain embodiment, activating or depressing the brake pedal 106, 116, 108, 118 rotates the wheel member 144 and operates the wheel brakes of the airplane.

In particular embodiments of the invention, the wheel member 144 may have a groove to seat the inner core 206 of the cable member 200. The cable member 200 is assembled onto the wheel member 144, which includes an element configured to hold on to the cable end ferrule 204.

In particular embodiments such as that shown in FIG. 3, the wheel member 144 is assembled to two cable members 200 such that the wheel member 144 is configured to hold on to two cable end ferrules 204. In this arrangement, rotation of the wheel member 144 in a first direction places tension on one of the two cable members 200, and rotation of the wheel member 144 in a second direction opposite the first direction places tension on the other of the two cable members 200. However, it is envisioned that embodiments of the invention include those in which the wheel member 144 has only one cable member 200, which reacts to tensile and compressive loads, and one attached end ferrule 204.

When the pilot, for example, presses down on one of the pedals 116 (shown in FIG. 1), the wheel member 144 is rotated in the aforementioned first direction. Through its attachment to the end ferrule 204, the rotation of the wheel member 144 tensions one of the cable members 200 displacing the inner core 206 of the cable through the arcuate distance of the wheel member rotation. In this example, the pilot-side pedal 106, 116 is depressed. The opposite end of the displaced cable member 200 is attached to a wheel member 146 (shown in FIG. 1) on one of the pilot-side bell cranks 134, 136. The wheel member 146 is similar to the wheel member 144 on the pedals 106, 108, 116, 118, and are attached to the end ferrule 204 of one or two cable members 200. As such, the aforementioned displacement of the wheel member 144 is transferred, via the cable member 200, to the wheel member 146.

The wheel member 146 is also attached to one end of the first or second connecting rod 112, 122. The other end of the connecting rod 112, 122 is attached to a wheel member 148 (shown in FIG. 1) on one of the co-pilot-side bell cranks 138, 140. As such, the aforementioned rotation of the pilot-side wheel member 146 causes the connecting rod 112, 122, to which it is attached, to move linearly in a horizontal direction. Movement of this connecting rod 112, 122 causes the co-pilot side wheel member 146 to rotate in correspondence with the rotation of wheel member 146. Rotation of the co-pilot-side wheel member 146 displaces its respective cable member 200, which rotates the wheel member 144 on the co-pilot-side pedal 108, 118, which, in turn, causes the co-pilot-side pedal 108, 118 to depress in concert with the pilot-side pedal 106, 116.

Conversely, if the copilot depresses a copilot-side pedal 108, 118, the aforementioned system of cable members 200, bell crank assemblies 130, 132, and connecting rods 112, 122 is configured to transmit motion from the copilot-side pedal 108, 118 through its respective connecting rod 112, 122 to the bell crank 134, 136, 138, 140 in the opposite bell crank assembly 130, 132. The driven bell crank assembly 130, 132 applies tension similarly to the opposing cable assembly 200 in the opposite station. In so doing, the cable tension transmits an identical motion back to the pedal 106, 116 of the opposite station.

Figure 4:
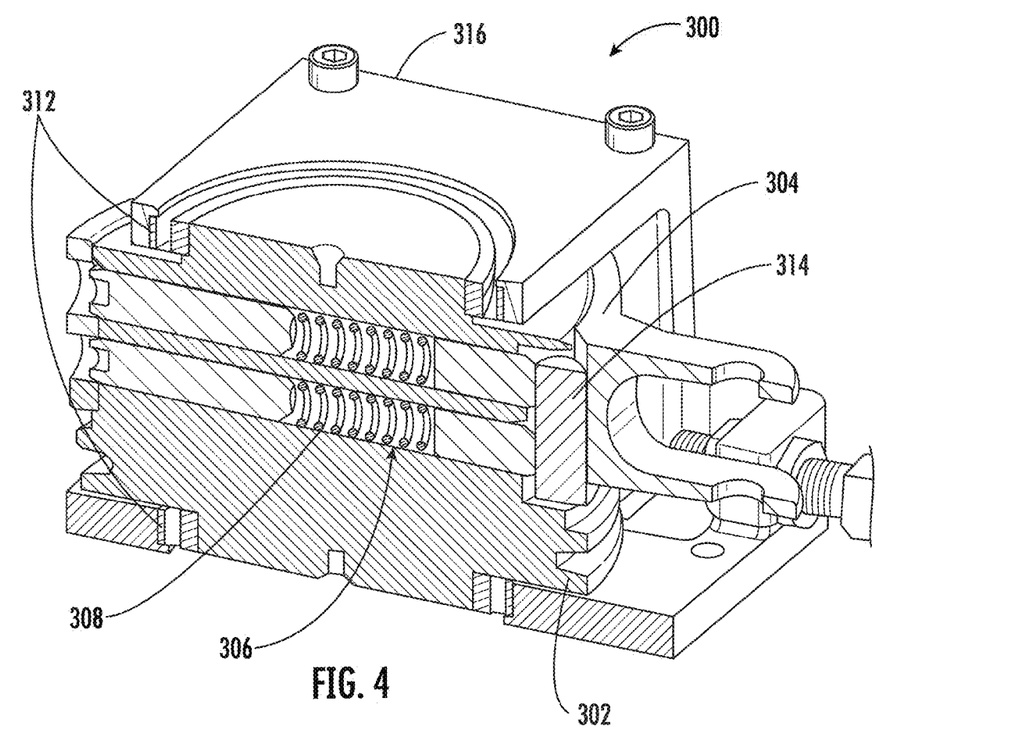
FIG. 4 is a perspective view of one of the bell crank assembly, constructed in accordance with an embodiment of the invention.

FIG. 4 is a perspective view of one of the bell crank assembly 300 represented by any of the four bell crank assemblies 134, 136, 138, 140 in the cable linked brake pedal assembly 100 of FIG. 1, and constructed in accordance with an embodiment of the invention. In the embodiment shown, the bell crank assembly 300 includes two separate members: an inner bell crank 302 and an outer bell crank 304 which are coupled together by a jam alleviation mechanism 306 that has a specific amount of torque preload that can be transferred. In a particular embodiment, one or both of the inner and outer bell cranks 302, 304 are configured as wheel members similar to the wheel in a pulley system.

Figure 5:
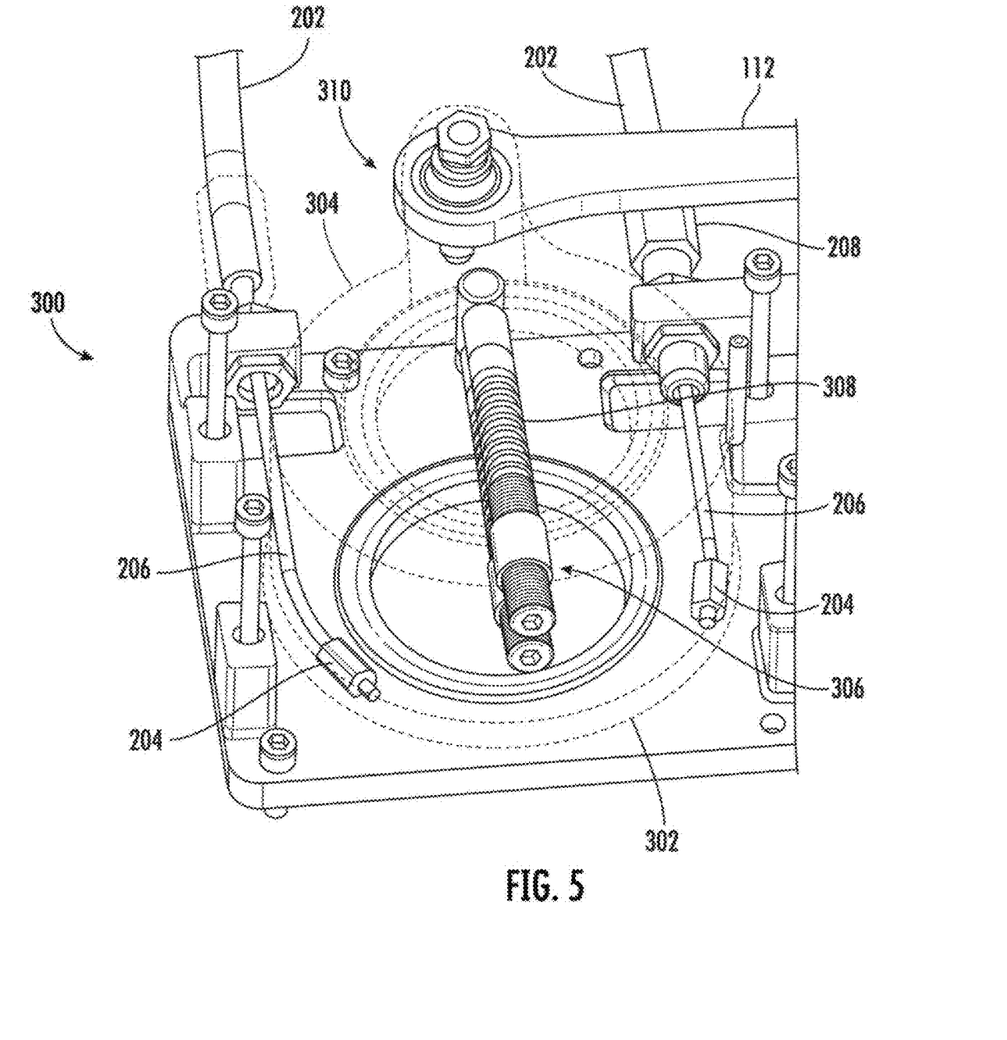
FIG. 5 is a perspective view of the bell crank assembly of FIG. 4 showing attached cable members, according to embodiments of the invention.

FIG. 5 is a perspective view of the bell crank assembly 300 of FIG. 4 showing attached cable members 200. In a particular embodiment of FIG. 5, the inner bell crank 302 is similar to the wheel member 144, 146 described above. Thus, embodiments of the inner bell crank 302 may be grooved to help seat the inner core 206 and end ferrule 204 of the cable member 200. In the embodiment shown, the inner bell crank 302 is attached to two cable members 200, though it is envisioned that, in alternate embodiments, the inner bell crank 302 may be attached to only one cable member 200. In the embodiments shown, the end fittings 208 of the two cable members 200 are secured within openings in a bell crank assembly housing 316. Outside of the bell crank assembly housing 316, the outer conduit 202, which provides a flexible service loop. The flexible service loop allows for adjustments to the pedal position and transfer of displacement without additional linkages. The flexibility also allows the assembly 100 to avoid interferences within the tight confines of the cockpit. Within the bell crank assembly housing 316, the inner core 206 and end ferrule 204 are attached to the inner bell crank 302.

In FIG. 5, the outer bell crank 304 includes a clevis 310 with an opening to facilitate the attachment of the outer bell crank 304 to the connecting rod 112, 122. The connecting rod 112, 122 may be attached to the clevis 310 of the outer bell crank 304 using a mechanical fastener, or the end of the connecting rod 112, 122 may be inserted through the opening in the clevis 310. The inner bell crank 302 and outer bell crank 304 are coupled by the jam alleviation mechanism 306 such that the bell cranks 302, 304 move in unison. In the particular embodiment of FIG. 5, the inner bell crank 302 and outer bell crank 304 each rotate on a respective set of bearings 312. In certain embodiments, such as shown in FIG. 5, the inner bell crank 302 is attached to two cable members 200, and seats two inner cores 206 and two end ferrules 204. However, in alternate embodiments, the inner bell crank 302 may be attached to one cable member 200.

As referenced above, one feature that may be incorporated in the jam alleviation mechanism 306 is the ability to limit the torque load that may be transmitted through the bell crank assembly 300. One advantage of such a feature could be reduced cable sizing and improved flexibility and force contributions for the cable assembly 200. FIGS. 4 and 5 show the jam alleviation mechanism 306 with a spring-loaded detent mechanism 308 to limit the torque load. In the event that a jam prevents the proper rotation of either the inner or outer bell cranks 302, 304, when a sufficient amount of torque is applied to one of the brake pedals 106, 108, 116, 118, the spring-loaded detent mechanism 308 displaces a pin 314 which breaks the connection between the inner and outer bell cranks 302, 304 allowing the inner bell crank 302 to rotate independently of the outer bell crank 304 and vice-versa. In this way, the jamming of one brake pedal does not affect the brake pedal of the opposite station.

In alternate embodiments of the invention, the jam alleviation mechanism 306 may be provided by a clutch, or a shear pin, or a torsional spring preload mechanism. For example, a particular embodiment of the jam alleviation mechanism 306 includes a clutch with a rotary friction disc assembly that is preloaded by a spring load to establish a prescribed amount of torque transmission capability. In the event of a system jam when a pedal load above the load that exceeds the prescribed friction torque is applied, the jam alleviation mechanism 306 will allow movement beyond the position at which the control is jammed. The exercised control may not return after load application depending on the nature of the jam.

In another embodiment, the jam alleviation mechanism 306 includes a shear pin in which a rotary coupling that contains the shear pin or necked down section of torsion shaft that is designed to fracture at prescribed amount of torque transmission capability. In the event of a system jam when a pedal load above the load that exceeds the prescribed shear torque is applied, the jam alleviation mechanism 306 will break free and allow free movement of the control station (pilot or copilot) that is not jammed.

In yet another embodiment, the jam alleviation mechanism 306 includes a torsion spring pre-load that utilizes a rotary sprung return-to-center device that is preloaded by a spring load to establish a prescribed amount of torque transmission capability. In the event of a system jam when a pedal load above the load that exceeds the prescribed friction torque is applied, the jam alleviation mechanism 306 will allow movement beyond the position at which the control is jammed and the controls will return to alignment at the jammed position upon removal of the load.

In another embodiment, the jam alleviation mechanism 306 could also be incorporated in the connecting rod 112, 122 in a linear fashion. In a further embodiment of the invention, the connecting rod 112, 122 could be removed altogether and all of the cable connections could be made through a single bell crank. In yet a further embodiment, both bell cranks assemblies 130, 132 and both connecting rods 112, 122 could be removed, such that a simple connection from the pilot pedal 106, 116 to the copilot pedal 108, 118 is made through a direct cable linkage between the two pedals. In such an embodiment, the jam alleviation mechanism 306 could be incorporated in a linkage segment within the direct cable linkage.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A cable-linked brake pedal assembly for an airplane, the assembly comprising:
 a first cable assembly with a first end attached to a pilot-side brake pedal and a second end attached to a first bell crank assembly;
 a second cable assembly with a first end attached to a copilot-side brake pedal and a second end attached to a second bell crank assembly;

a first connecting rod with a first rod end attached to the first bell crank assembly and a second rod end attached to the second bell crank assembly;

the connection between the first and second cable assemblies, first and second bell crank assemblies, and first connecting rod being configured such that depressing the pilot-side brake pedal moves the first cable assembly, first connecting rod, and second cable assembly in such a way as to cause a corresponding depression of the copilot-side brake pedal.

2. The cable-linked brake pedal assembly of claim 1, wherein the connection between the first and second cable assemblies, first and second bell crank assemblies, and first connecting rod is configured such that depressing the copilot-side brake pedal moves the second cable assembly, first connecting rod, and first cable assembly in such a way as to cause a corresponding depression of the pilot-side brake pedal.

3. The cable-linked brake pedal assembly of claim 1, further comprising:

a third cable assembly with a first end attached to a second pilot-side brake pedal and a second end attached to a third bell crank assembly;

a fourth cable assembly with a first end attached to a second copilot-side brake pedal and a second end attached to a fourth bell crank assembly;

a second connecting rod with a first rod end attached to the third bell crank assembly and a second rod end attached to the fourth bell crank assembly;

the connection between the third and fourth cable assemblies, third and fourth bell crank assemblies, and second connecting rod being configured such that depressing the second pilot-side brake pedal moves the third cable assembly, second connecting rod, and fourth cable assembly in such a way as to cause a corresponding depression of the second copilot-side brake pedal.

4. The cable-linked brake pedal assembly of claim 3, wherein the connection between the third and fourth cable assemblies, third and fourth bell crank assemblies, and second connecting rod is configured such that depressing the second copilot-side brake pedal moves the fourth cable assembly, second connecting rod, and third cable assembly in such a way as to cause a corresponding depression of the second pilot-side brake pedal.

5. The cable-linked brake pedal assembly of claim 1, wherein the first bell crank assembly includes an inner bell crank and an outer bell crank, each configured as a wheel member, the inner bell crank attached to an end of the first cable assembly.

6. The cable-linked brake pedal assembly of claim 5, wherein the outer bell crank is attached to the first rod end of the first connecting rod.

7. The cable-linked brake pedal assembly of claim 5, wherein the inner and outer bell cranks are coupled by a jam alleviation mechanism such that the inner and outer bell cranks move in unison.

8. The cable-linked brake pedal assembly of claim 7, wherein the jam alleviation mechanism comprises a spring-loaded detent mechanism configured to uncouple the inner and outer bell cranks so that the inner bell crank can move independently of the outer bell crank.

9. The cable-linked brake pedal assembly of claim 8, wherein the spring-loaded detent mechanism is configured to displace a pin that couples the inner and outer bell cranks when a predetermined amount of torque is applied to the first bell crank assembly.

10. The cable-linked brake pedal assembly of claim 1, wherein the first cable assembly includes an inner core, which is drawn in tension when the pilot-side brake pedal is depressed.

11. The cable-linked brake pedal assembly of claim 1, wherein the first cable assembly further includes an outer conduit with a flexible service loop.

12. The cable-linked brake pedal assembly of claim 1, wherein the first cable assembly further includes an end fitting to facilitate attachment to the first bell crank assembly.

13. The cable-linked brake pedal assembly of claim 1, wherein the first cable assembly further includes an end ferrule configured for attachment to a bell crank of the first bell crank assembly.

* * * * *